United States Patent

[11] 3,554,351

| [72] | Inventors | Theo Rothenbach;<br>Werner Gaberthuel, Neuhausen am Rheinfall, Switzerland |
|---|---|---|
| [21] | Appl. No. | 774,293 |
| [22] | Filed | Nov. 8, 1968 |
| [45] | Patented | Jan. 12, 1971 |
| [73] | Assignee | Schweizerische Industrie-Gesellschaft<br>Neuhausen am Rheinfall, Switzerland |
| [32] | Priority | Nov. 20, 1967 |
| [33] |  | Switzerland |
| [31] |  | No. 16205/67 |

[54] DEVICE FOR LINING UP OBJECTS
3 Claims, 5 Drawing Figs.

[52] U.S. Cl. .................................................. 198/21, 198/31
[51] Int. Cl. ...................................................... B65g 47/42
[50] Field of Search............................................ 198/21, 24, 31, 31(A2)

[56] References Cited
UNITED STATES PATENTS
| 3,160,259 | 12/1964 | Dalton.......................... | 198/21 |
| 3,250,371 | 5/1966 | Cella et al..................... | 198/31(A2) |

*Primary Examiner*—Evon C. Blunk
*Assistant Examiner*—Alfred N. Goodman
*Attorney*—Singer, Stern and Carlberg

ABSTRACT: Objects delivered by a supply conveyor onto a table operate feelers that control the operation of a pusher for moving the objects so assembled and lined up to a further conveyor. Further embodiments include brakes, additional feelers, additional independently driven conveyors, and time comparator circuits for improving the performance.

3,554,351

DEVICE FOR LINING UP OBJECTS

BACKGROUND OF THE INVENTION

The invention relates to a device for lining up objects that are carried irregularly spaced in two or more rows on a conveyor to a collecting table from where a pusher moves them in groups to a further conveyor.

Devices of this sort are used, for example, with machines for wrapping collective packages, whereby the individual packages or boxes from the packaging machine are combined into groups to form collective packages. Such devices which handle a row of individual packages coming from a single packaging machine are known. Also forming part of the prior art are devices that guide the output of two packaging machines to a single machine for wrapping collective packages, the two separate rows of individual packages being combined into a single row by a deflector before the packages are delivered to the wrapping machine. The output of a device of this kind is limited, since the frequency at which the pusher strokes cannot exceed a given value.

SUMMARY OF THE INVENTION

The purpose of the invention is a device for lining up objects, such as individual packages, which are delivered to the device in two or more rows.

BRIEF DESCRIPTION OF THE DRAWING

The invention will be described, with reference to the FIG. of the accompanying drawings, wherein.

DESCRIPTION OF THE PREFERRED EMBODIMENT

Figure 1:
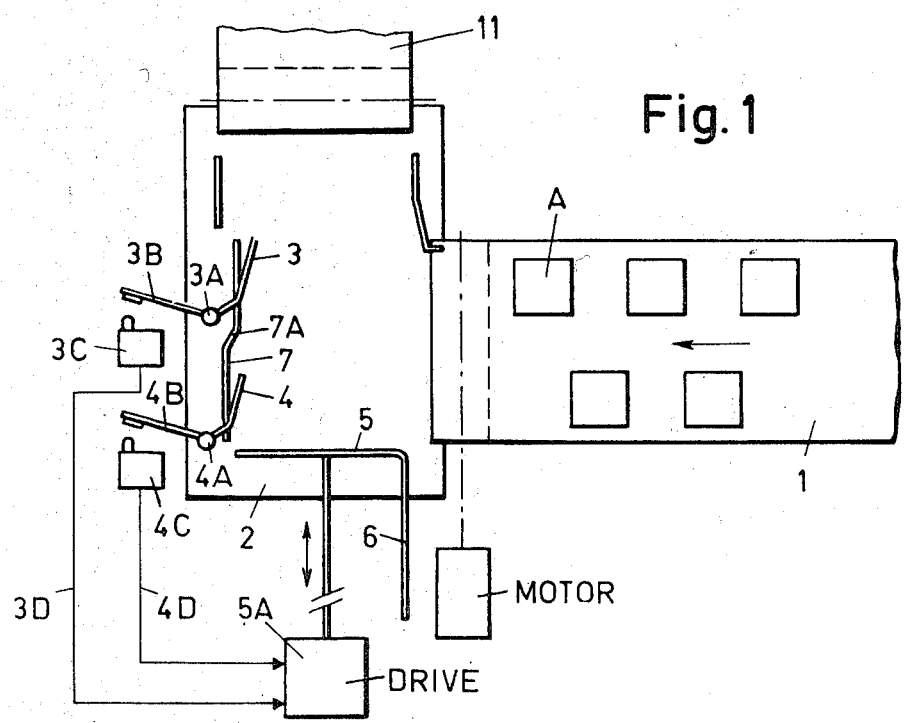
FIGS. 1 and 2 are top views of a first embodiment of the invention in two different positions of operation.
Figure 2:
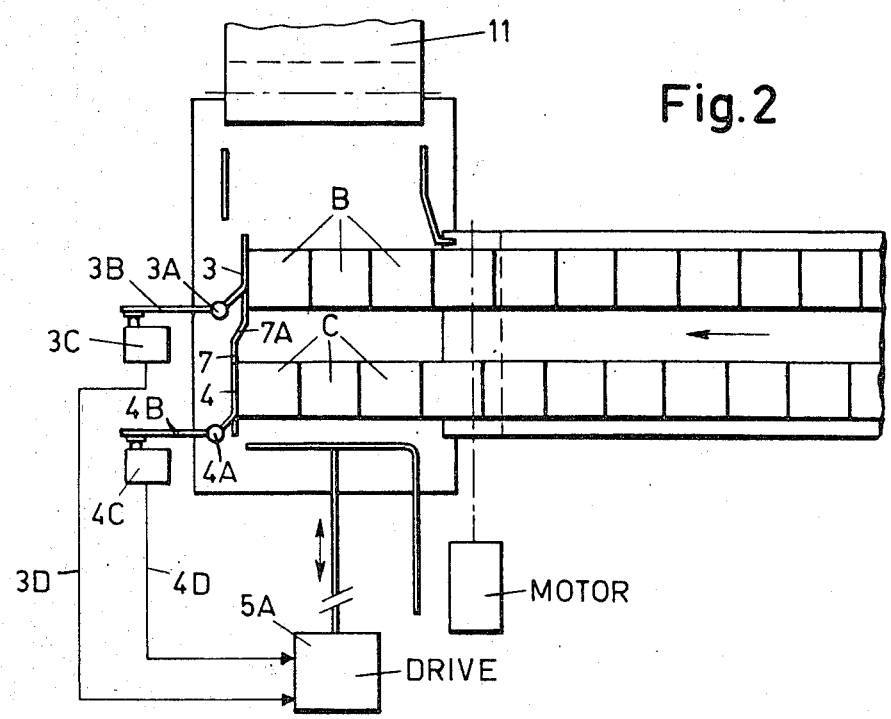

In the embodiment illustrated in FIGS. 1 and 2, the objects A, such as individual packages or boxes, which are to be lined up into rows, are carried by a conveyor belt 1 to a collecting table 2, in two rows in which the objects are irregularly spaced. As shown in FIG. 2, these objects form on the table two rows of contiguous objects, since each successive object pushes the preceding one further onto the table until the leading object is pushed against a stepped wall 7. A pusher 5 moves to and fro crosswise to the direction of movement of the conveyor 1, and pushes the same number of objects in each row onto a further conveyor belt 11. In the embodiment shown, the pusher 5 pushes three objects B and C out of each row onto the conveyor 11, which carries the objects in groups of six to a wrapping machine. Two lineup feelers 3 and 4, one for each row, are associated with the wall 7. These feelers, mounted free to pivot about supports 3A and 4A, cause respective movable contacts 3B and 4B of switches 3C and 4C to swing in an arc to open or to close these switches. The arriving objects push the feelers into the plane of the wall 7, so as to close the switches 3C and 4C. The control for the pusher drive 5A is so designed that the pusher 5 is propelled forward only when both feelers 3 and 4 close their respective switches 3C and 4C, which are each connected by respective lines 3D and 4D to the pusher drive 5A. This ensures that each row will consist of at least three objects pushed one against the other. As soon as the pusher has finished its working stroke it is drawn back to its starting position.

The pusher 5 incorporates a lateral tongue 6, which prevents more objects A from being moved onto the collecting table 2 while the pusher is extended. The step 7A in the wall 7 serves to stagger somewhat the two rows of objects, so that the row nearest the conveyor 11, the front row, does not hamper the movement of the back row, when the pusher 5 moves the objects onto the conveyor 11. Each time that the pusher moves forward, the wall 7 is so moved from the position shown in FIGS. 1 and 2 as to clear a path for the back row of objects.

In the embodiment shown in FIGS. 1 and 2, the number of objects A in each row on the conveyor 1 must be the same. If this is not the case, the two rows must be made equal by hand.

Figure 3:
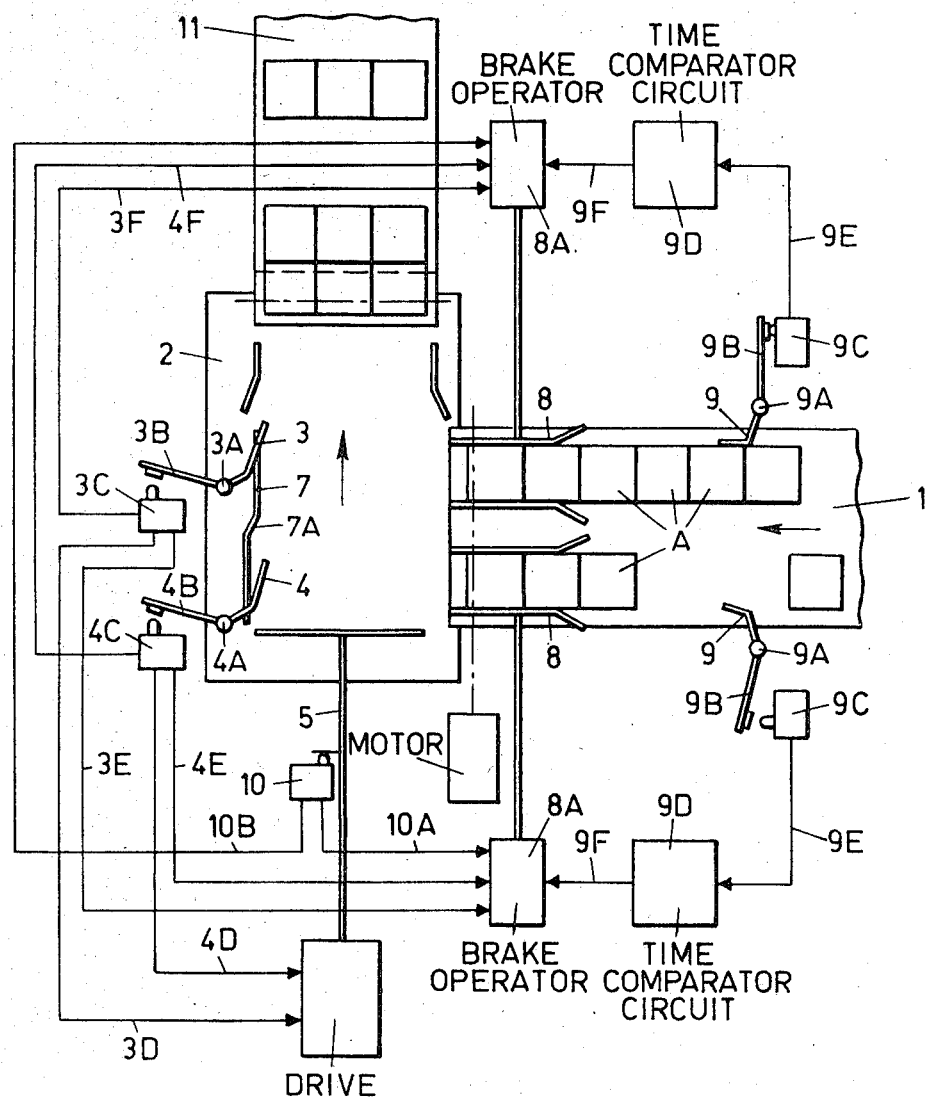
FIGS. 3, 4, and 5 are each a top view of a further embodiment of the invention.

The embodiment illustrated in FIG. 3, an improved form of the invention, eliminates this disadvantage. In this case, in addition to the parts for the previous embodiment, there is provided for each row of objects A a brake 8, which can stop the objects on the continuously moving conveyor 1, so that they cannot reach the collecting table 2. In addition, a backup feeler 9 for each row is located upstream of the brakes 8; and a further feeler 10 is located next to the pusher 5 and operated by the latter when the pusher is located at, or near, its starting position. This feeler is connected by respective lines 10A and 10B to a respective brake operator 8A, to which, further, the switch 4C is connected by respective lines 4E and 4F, and the switch 3C by lines 3E and 3F.

This embodiment operates in the following manner. The objects A on the conveyor 1 are at first stopped by the brakes 8. Each feeler 9 is connected by a respective time comparator circuit 9D and line 9E and 9F to the corresponding brake operator 8A, each feeler 9 being mounted free to swing about a support 9A and thereby to operate the movable contact 9B of a respective switch 9C. If a switch 9C is closed for a longer time than would be the case were a single object A to pass by the respective feeler 9, this means that the objects A have braked up as far as the feeler 9. Provided now that the pusher 5 operates the feeler 10, the respective brake 8 will be released by its brake operator 8A, so that the row of objects A can be moved onto the collecting table 2, where it operates the feeler 3 or 4 corresponding to that row, such as feeler 3, causing the brake 8 to be applied again. If the objects A of the second row (corresponding to the feeler 4) back up enough to operate their backup feeler 9 before the objects of the first row operates its lineup feeler 3, the brake 8 of the second row is also released, and the pusher 5 is not operated until the second row operates its lineup feeler 4. This ensures that a group of six objects will be pushed onto the conveyor 11.

On the other hand, if the lineup feeler 3 of the first row was operated before the second row operated its backup feeler 9, the brake 8 of the second row remains applied until the pusher 5 has pushed away the three objects of the first row, and has returned to its starting position and operated the feeler 10, which latter causes the brake 8 of the second row to be released, provided that the corresponding backup feeler 9 confirms that the objects A are backed up to its position. This embodiment ensures an automatic accommodation to the conditions of any given moment in the two delivery lines on the conveyor 1.

In this form of the invention the pusher 5 requires no tongue 6.

The invention as illustrated in FIG. 3 causes the objects in groups of three or six to be pushed onto the conveyor 11. In order to ensure that a complete group of six objects is always formed, a second backup station must be provided. True, the respective brakes 8 could be released only when both backup feelers 9 were operated: but if the objects for the one row were absent, then the objects of the other row would have to be held stationary during this time, so that the moving conveyor could wear through the wrappings of the objects held.

Figure 4:
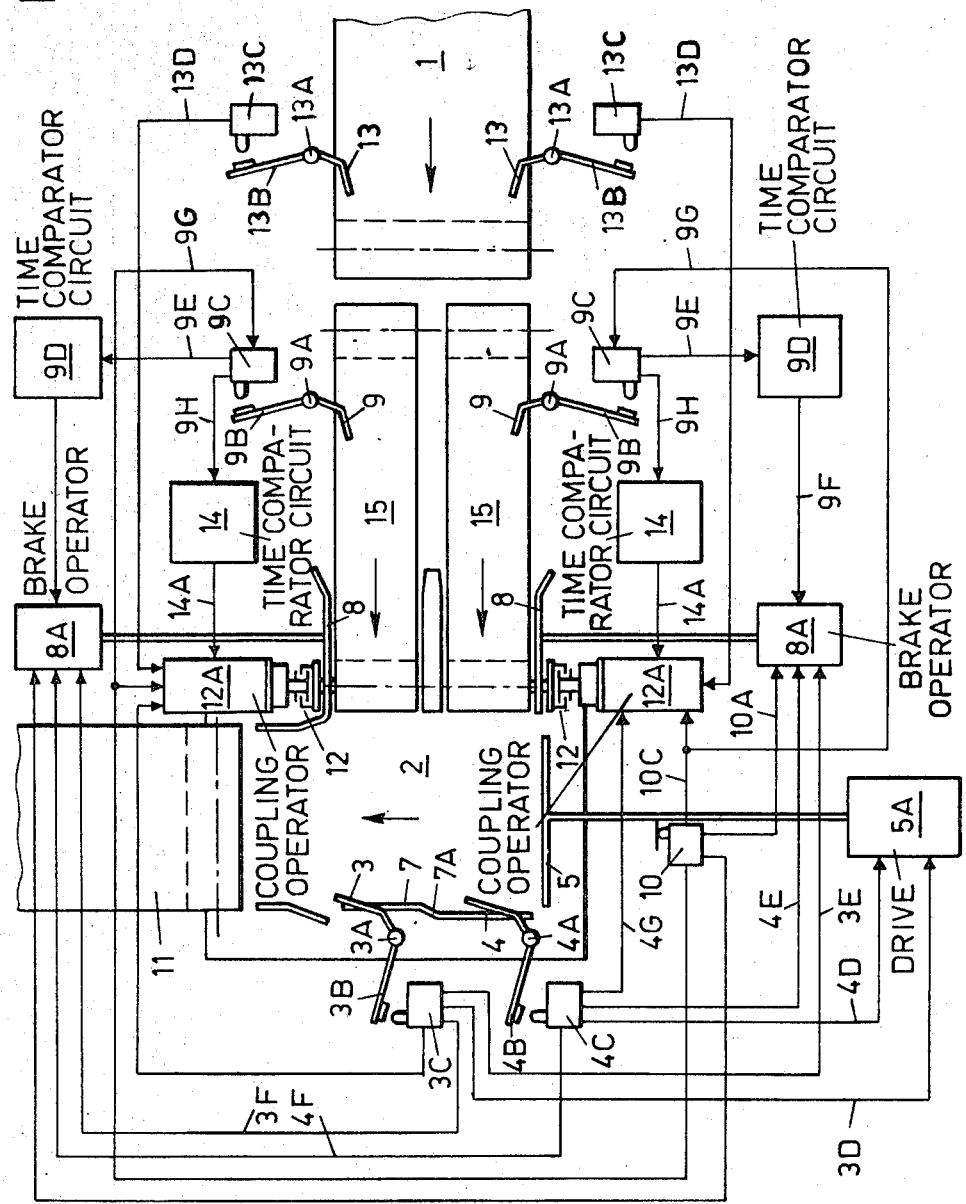

The embodiment shown in FIG. 4 avoids this drawback.

Two independently driven intermediate conveyors 15 are placed between the conveyor 1 and the collecting table 2. The brakes 8 and the backup feelers 9 cooperate with these two intermediate conveyors which are driven by couplings 12, which can be disengaged. Two prefeelers 13 are located on either side of he the conveyor 1 to pivot about supports 13A, operating the movable contacts 13B of switches 13C connected to respective ones of the coupling operators 12A by respective lines 13D.

This embodiment operates in the following manner. When objects on the conveyor 1 operate one of the prefeelers 13, the coupling 12 of the corresponding intermediate conveyor is caused to be engaged by its operator 12A, provided that the pusher 5 is in its starting position; and this intermediate conveyor advances the objects until they are stopped by the brake 8. If the prefeeler confirms that after a certain, adjustable time no more objects are passing by, it causes the corresponding coupling 12 to be disengaged. The coupling could also be caused to be disengaged by the corresponding backup feeler 9. If the backup feeler 9 confirms that a row of the objects extends to its position, the corresponding brake 8 is released, and the row moves forward until the corresponding lineup feeler 3 or 4 is operated. The switch 3c or 4c of the latter is connected by a line 3G or 4G to the corresponding coupling 12, and when operated causes this coupling to be disengaged. If the other lineup feeler is also operated, the pusher drive 5A, which is connected to each of the switches 3C and 4C operated by the corresponding lineup feelers 3 and 4, is operated, so that a group of six objects is pushed onto the conveyor 11. When the pusher 5 returns to its starting position, it operates the feeler 10, which, in addition to its function described in connection with the embodiment shown in FIG. 3, causes the couplings 12 of the two intermediate conveyors to be reengaged. For this purpose, the feeler 10 is connected to each of these couplings by respective lines 10C and 10D. Simultaneously, the two backup feelers 9 are again made active, via respective lines 9G which directly connect each feeler to a respective coupling, after having necessarily been made inactive while the intermediate conveyors 15 are stationary, in order that a single object on the still conveyor cannot cause a false signal from a time comparator circuit. Each switch 9C is connected to a corresponding coupling 12 via lines 9H and 14A and a time comparator circuit 14, which latter ensures that the corresponding coupling is engaged only when the feeler 9 is operated by a backed-up row of objects.

When the conveyor 1 is fully loaded, a certain amount of time is lost, because even when the objects are lined up from the brake 8 to the backup feeler 9, the brake 8 is released only after the time required by the time comparator circuit, in order to ensure that a complete group of objects is moved onto the collecting table 2. This would not be the case, if the most advanced object of a row had been stopped at the backup feeler 9 while the corresponding intermediate conveyor 15 was stationary.

Figure 5:
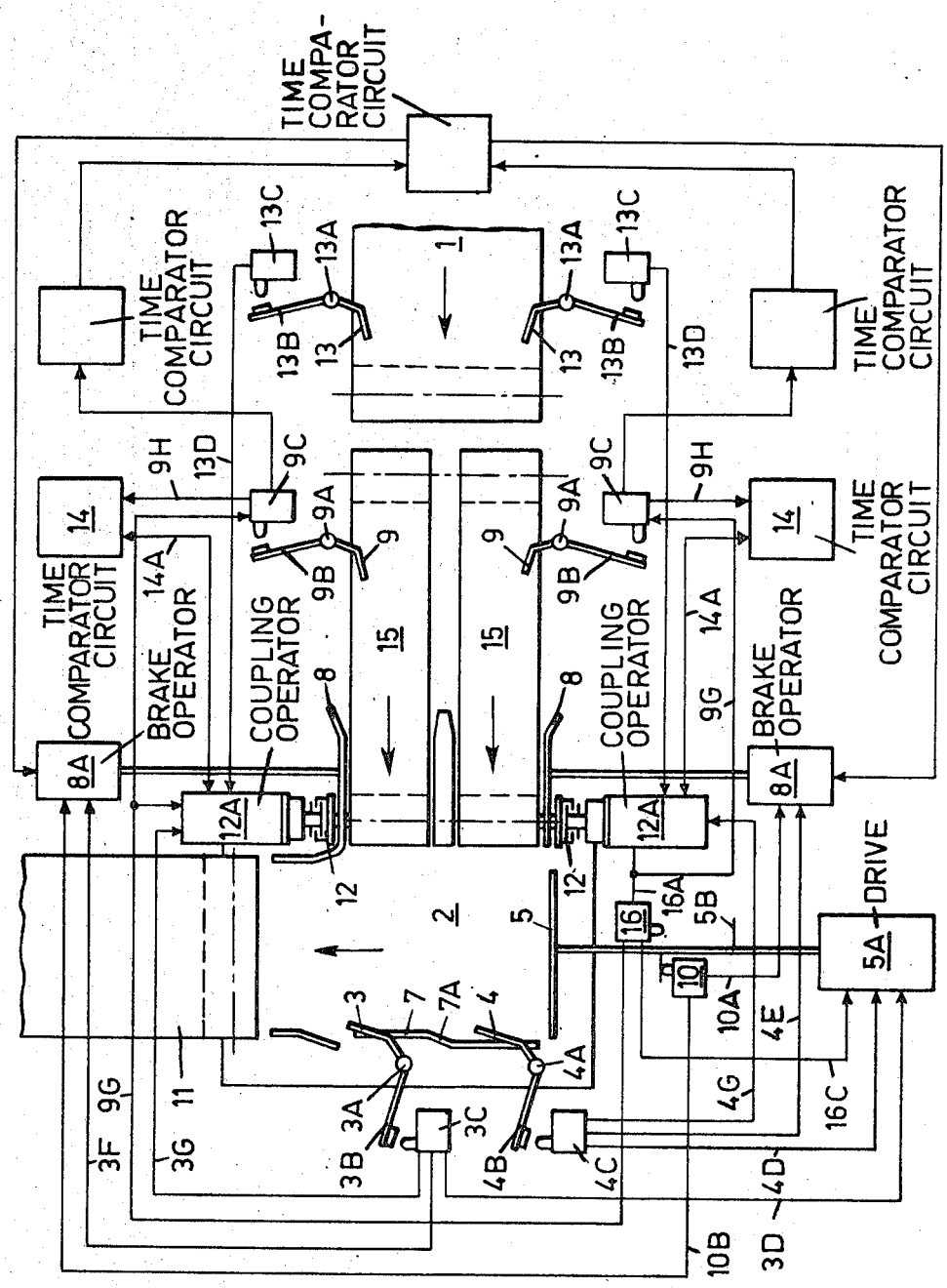

In order to avoid even this loss of time, a switch 16 can be provided, in accordance with the embodiment shown in FIG. 5, which is operated by an arm 5B on the pusher 5, when the latter is fully extended, This switch is connected by a respective line 16A and 16B to each coupling 12, and by a line 16C to the pusher drive 5A. The two functions of this switch are, one, to cause the coupling 12 to be engaged to drive the intermediate conveyors 15 and, two, to cause the pusher 5 to be retracted. The switch 16, when operated by the pusher 5, ensures that the intermediate conveyors are restarted earlier than would otherwise be the case. This restarting causes the backup feelers 9 to start the time comparator circuit. When the pusher 5 has returned to its starting position it waits only so long as is necessary to move three objects from the brake 8 onto the collecting table 2 to the lineup feelers 3 and 4 before it makes a new stroke.

When the two rows contain an unequal number of objects, the brake of the other row, in the embodiments shown in FIGS. 3 to 5, can also be released by its backup feelers, provided that the one row, the brake for which is released, has not yet operated its lineup feeler. It follows that there is a period, dependent, first, on the path length travelled by the leading object from the position in which it is released to the position in which it operates its lineup feeler and, second, on the conveyor speed, during which the brake of the other row can be released. The efficiency of the invention can be further improved by shortening this period, by incorporating a further time comparator circuit, of which the time delay can be varied to suit the conditions present. This time comparator circuit can be started, for example, when the brake of the one row is released. It limits—from the moment it is started—the period during which the brake of the other row can be released. After expiration of this adjustable period, the brake of the other row is locked so that it cannot open when its backup feeler is operated. The first three objects of the other row are then certain to be pushed onto the conveyor 11 by the next stroke of the pusher 5.

In accordance with the invention, not only two but three or more rows of objects can be analogously handled.

It will be understood by those skilled in the art that the various feelers in the different embodiments incorporate any suitable means, such as return springs, which permit the feelers to pivot at the same time that they bias them to a position in the path of the objects.

Since the feelers and their associated switches, the time comparator circuits, the drive couplings for the intermediate conveyors the pusher drive, the brakes, and the operators for the drive couplings and the brakes are all well known in the art, and, moreover, do not, of themselves, constitute the invention, which, instead, is constituted by their novel combination, it is not necessary to describe them or their functions in greater detail.

Although the preferred embodiments of the invention have been described, the scope of, and the breadth of protection afforded to, the invention are limited solely by the appended claims.

We claim:

1. A device for lining up objects, such as individual packages or boxes, that are carried irregularly spaced in at least two rows on at least one first conveyor, and including a collecting table for receiving the objects advanced by said first conveyor; a pusher for moving from a starting position the objects in groups from said table to a second conveyor; an individual lineup feeler associated with said table for each row of objects, and positioned to be operated by the leading object of a respective row for controlling the operation of said pusher to cause the latter to execute a stroke only when an object has operated at least one of said lineup feelers, a brake located at the discharge end of said first conveyor for each row of objects for holding the objects stationary on said first conveyor while the latter is moving when said brake is applied, an individual backup feeler associated with said first conveyor upstream of each said brake for controlling the release of the respective said brake, and positioned to be operated by the backed-up objects of a respective row, said first conveyor comprising as many intermediate conveyors as there are rows of objects, and further including a supply convey for delivering rows of irregularly spaced objects to said intermediate conveyors; an individual disengageable drive coupling for each said intermediate conveyor; a prefeeler associated with said supply conveyor for each row of objects thereon, and positioned to be operated by the objects of a respective row for controlling the operation of the drive coupling of the corresponding intermediate conveyor, whereby the drive coupling is caused to be engaged when said prefeeler is operated by a passing object.

2. The device as defined in claim 1, including a time comparator circuit connected between each said backup feeler and the corresponding said brake, and controlled by the respective said backup feeler, for ensuring that the respective said brake is released only when a backed-up row of objects has operated the corresponding said backup feeler, and a further individual time comparator circuit connected between each said backup feeler and the corresponding said drive coupling, and controlled by the respective said backup feeler, for ensuring that the corresponding drive coupling is engaged only when a backed-up row of objects has operated the corresponding backup feeler.

3. The device as defined in claim 1, including a switch operated by said pusher when the latter is at the end of its working stroke for controlling the retraction of said pusher and the engagement of said drive couplings.